United States Patent Office 2,966,489
Patented Dec. 27, 1960

2,966,489
6-NITRO QUINOLONE DERIVATIVES

Walter Hepworth and Dora Nellie Richardson, Manchester, England, assignors to Imperial Chemical Industries Limited, London, England, a corporation of Great Britain No Drawing. Filed Mar. 7, 1958, Ser. No. 719,721

Claims priority, application Great Britain Mar. 22, 1957

7 Claims. (Cl. 260—287)

This invention relates to new organic compounds and more particularly it relates to new quinolone derivatives which possess useful antibacterial activity.

According to the invention we provide new quinolone derivatives of the formula:

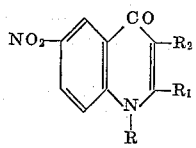

wherein R stands for an alkyl or alkenyl radical, optionally substituted, wherein $R_1$ stands for a hydrogen atom or for a hydrocarbon radical, optionally substituted, and wherein $R_2$ stands for an amino group or a substituted amino group, and the salts thereof.

As suitable values of R there may be mentioned for example the methyl, ethyl, propyl, butyl, β-hydroxyethyl and allyl radicals.

As suitable values of $R_1$ there may be mentioned for example alkyl radicals for example the methyl radical.

As a suitable substituted amino group ($R_2$) there may be mentioned for example the alkylamino, dialkylamino, aralkylamino, arylamino, acylamino, sulphonylamino, alkoxycarbonylamino, ureido and guanidino radicals, including, for example the methylamino, dimethylamino, formylamino, acetylamino, benzoylamino, p-aminobenzenesulphonylamino, ethoxycarbonylamino and benzoylguanidino radicals.

Suitable salts of the said new quinolone derivative include for example and in particular salts thereof with non-toxic and pharmaceutically acceptable acids for example salts with the common inorganic acids for example hydrochloric acid.

Particularly valuable new quinolone derivatives of the invention are the compounds 3-amino-1-methyl-6-nitro-4-quinolone, 3-formamido-1-methyl-6-nitro-4-quinolone, 3-dimethylamino-1-methyl-6-nitro-4-quinolone, 3-amino-1:2-dimethyl-6-nitro-4-quinolone and 3-acetamido-1:2-dimethyl-6-nitro-4-quinolone.

According to a further feature of the invention we provide a process for the manufacture of those of the new quinolone derivatives of the invention wherein $R_2$ stands for an amino group which comprises hydrolysis of the corresponding acylamino compounds.

The said hydrolysis may be carried out by heating the corresponding acylamino compound in a mineral acid medium for example in a medium containing aqueous hydrochloric acid.

According to a further feature of the invention we provide a process for the manufacture of those of the new quinolone derivatives of the invention wherein $R_2$ stands for a substituted amino group which is not substantially harmed by nitrating conditions which comprises nitration of the corresponding compounds wherein the 6-position of the quinolone ring system is unsubstituted.

As suitable substituted amino groups there may be mentioned the "protected" amino groups known to the art for example acylamino groups for example the acetylamino group and dialkylamino groups for example the dimethylamino group. Suitable nitrating conditions may be for example the use of a mixture of concentrated nitric acid and concentrated sulphuric acid at a temperature of 0–10° C.

According to yet a further feature of the invention we provide a process for the manufacture of those of the new quinolone derivatives of the invention wherein $R_2$ stands for the amino group which comprises subjecting the corresponding quinolones wherein the 3-position is substituted by a suitable derivative of the carboxy group to one or the other of the processes known to the art as the Hofmann and Curtius reactions.

In the Hofmann reaction the derivative of the carboxy group is normally the carbamyl group and the method comprises subjecting the quinolone compounds containing this group in the 3-position to the action of hypochlorite or hypobromite. Certain variations in this standard procedure as known to the art may also be employed for example the corresponding N-bromoamides or hydroxamic acids may be used as starting materials. Thus when for example 3-carbamyl-1-methyl-6-nitro-4-quinolone is treated with hypobromite there is obtained 3-amino-1-methyl-6-nitro-4-quinolone.

In the Curtius reaction the derivative of the carboxy group is the azide thereof and the method comprises subjecting 3-azidocarbonylquinolone compounds to thermal decomposition. When the said decomposition is carried out in the presence of an alcohol there is obtained, instead of the corresponding 3-aminoquinolones, the corresponding 3-alkoxycarbonylaminoquinolones. Thus for example whereas thermal decomposition of 3-azido-carbonyl-1-methyl-6-nitro-4-quinolone gives 3-amino-1-methyl-6-nitro-4-quinolone, the said decomposition carried out in ethanol gives 3-ethoxycarbonylamino-1-methyl-6-nitro-4-quinolone. The latter can of course in turn be decomposed by hydrolysis giving the same ultimate product namely 3-amino-1-methyl-6-nitro-4-quinolone.

It is to be understood therefore that the Curtius reaction may also conveniently be used for the manufacture of the new quinolone derivatives of the invention wherein $R_2$ stands for an alkoxycarbonylamino group.

The 3-azidocarbonylquinolones used in the Curtius reaction may conveniently be obtained by known methods for example by interaction of the corresponding acid halides and sodium azide or by the action of nitrous acid on the corresponding acid hydrazides, which may themselves readily be obtained for example by interaction of the corresponding acid esters or halides with hydrazine.

According to a further feature of the invention we provide a process for the manufacture of the said new quinolone derivatives which comprises alkylation of 4-hydroxyquinoline derivatives of the formula:

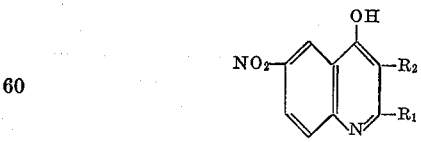

wherein $R_1$ and $R_2$ have the meanings stated above.

It is to be understood that the term alkylation here includes alkylation with the modified alkyl radical represented by the alkenyl radical, that is it comprises the allied processes referred to more specifically as alkylation and alkenylation respectively.

The alkylation procedures applicable to this process of the invention include for example interaction of the 4-hydroxyquinoline derivatives of the above formula with esters of alcohols of the formula ROH wherein R has the meanings stated above, for example with esters thereof with inorganic acids for example with sulfuric acid or with haloacids for example with hydriodic acid, or with organic acids for example with p-toluenesulphonic acid, for example dimethyl sulphate, ethyl iodide and methyl p-toluenesulphonate. The said interaction may conveniently be carried out in an inert solvent or diluent, preferably in the presence of alkali, for example it can conveniently be carried out in aqueous alkali for example in aqueous sodium hydroxide solution.

The quinolone derivatives of the invention wherein the substituent $R_2$ stands for a substituted amino group may conveniently be prepared from the corresponding quinolone derivatives of the invention wherein $R_2$ stands for the amino groups by known standard procedures for example conversion of the said amino group into for example alkylamino, dialkylamino, aralkylamino and arylamino groups by alkylation, aralkylation or arylation procedures, into for example acylamino, sulphonamino and alkoxycarbonylamino groups by acylation procedures and into for example ureido and guanidino groups by condensation procedures.

As stated above the new quinolone derivatives of the invention possess useful antibacterial activity. We have found for example that bacterial infections due to *Salmonella dublin* can be controlled by administration of the said quinolones and that said administration can be local, or systemic for example oral or parenteral, according to the site of infection.

According to a further feature of the invention therefore we provide compositions for the control of bacterial growth and for the treatment and prophylaxis of bacterial infections comprising as active ingredient at least one of the new quinolone derivatives of the invention.

The compositions of the invention include for example standard pharmaceutical formulations of the said active ingredient or ingredients as known to the arts of human and veterinary medicine and as applicable to the local or systemic control of bacterial infections. Said compositions include for example aqueous and non-aqueous solutions and suspensions, dispersible powders and granules, creams and ointments, tablets, pills, pessaries, bougies, etc., mixtures with foodstuffs and mixtures with solid diluents for admixture with foodstuffs. The said compositions may optionally also contain other known therapeutic agents.

The new quinolone derivatives and the compositions thereof of the invention may be applied directly or indirectly for the control of bacterial growth and in the prophylaxis and treatment of bacterial infections.

The invention is illustrated but not limited by the following examples which are by weight:

*Example 1*

6.7 parts of 3-acetamido-1-methyl-4-quinolone are added with cooling to 72 parts of concentrated sulphuric acid. A mixture of 3.6 parts of concentrated nitric acid (density=1.42) and 5.3 parts of concentrated sulphuric acid is added to the above solution during 30 minutes at 0–10° C. After a further 15 minutes the solution is poured on to 400 parts of ice and water. The mixture is filtered and the solid residue is washed with water until the washings are no longer acidic. There is thus obtained 3 - acetamido-1-methyl-6-nitro-4-quinolone which after crystallisation from 3-ethoxyethanol forms yellow needles, M.P. 330–334° C. with decomposition.

*Example 2*

A mixture of 4.5 parts of 3-(N-methyl acetamido)-1-methyl-4-quinolone and 55 parts of concentrated sulphuric acid is cooled to below 10° C. and added slowly with stirring to a mixture of 4.5 parts of concentrated sulphuric acid and 3.25 parts of concentrated nitric acid. The temperature is then allowed to rise to room temperature over a period of three quarters of an hour, when the mixture is poured on to 500 parts of ice and basified with aqueous 40% sodium hydroxide solution keeping the temperature below 10° C. The precipitated solid is collected, washed with water and dried. Crystallisation thereof from β-ethoxyethanol gives 3-(N-methyl acetamido)-1-methyl-6-nitro-4-quinolone as yellow plates M.P. 283° C.

The 3-(N-methylacetamido)-1-methyl-4-quinolone used as starting material is itself prepared as follows: 6 parts of 1-methyl-3-methylamino-4-quinolone and 16.5 parts of acetic anhydride is boiled under reflux for 1 hour. After drowning in ice sufficient aqueous 40% sodium hydroxide solution is added to make the mixture alkaline to Clayton Yellow paper. On stirring a thick precipitate of white needles is formed. This is collected, dried and crystallised from chlorobenzene giving 3-(N-methyl acetamido)-1-methyl-4-quinolone, M.P. 191–193° C.

The 1-methyl-3-methylamino-4-quinolone is prepared as follows: 16 parts of 1-methyl-3(N-methyl-p-toluenesulphonamido)-4-quinolone are boiled under reflux for 1 hour with 75 parts of 70% sulphuric acid. Aqueous 40% sodium hydroxide solution is then added to the cooled solution until alkaline to Clayton Yellow paper. The yellow crystalline product is collected, washed with water, dried, and crystallised from benzene giving bright yellow plates of 1-methyl-3-methylamino-4-quinolone, M.P. 177–178° C.

The 1-methyl-3-(N-methyl-p-toluenesulphonamido)-4-quinolone is itself prepared as follows: 18 parts of 1-methyl-3-(p-toluenesulphonamido)-4-quinolone are dissolved in a solution prepared from 5.5 parts of sodium hydroxide pellets and 330 parts of water. This solution is filtered and 7.85 parts of neutralised dimethyl sulphate are added to the filtrate with vigorous stirring. The mixture is stirred for a further 30 minutes and the solid is then collected, washed with water, dried at 100° C. and crystallised from acetic acid giving 1-methyl-3-(N-methyl-p-toluenesulphonamido)-4-quinolone, M.P. 152–153° C.

The 1-methyl-3-(p-toluenesulphonamido)-4-quinolone is prepared as follows: To a mixture of 1.74 parts of 3-amino-1-methyl-4-quinolone and 25 parts of dry pyridine there are added, below 20° C., 2.86 parts of p-toluene sulphonyl chloride. The mixture is allowed to stand for one hour and is then poured into 200 parts of water. The solid is collected, dried and crystallised from β-ethoxyethanol giving 1-methyl-3-(p-toluenesulphonamido)-4-quinolone, M.P. 257° C.

*Example 3*

In like manner to that described in Example 1, but using 6.7 parts of 3-dimethylamino-1-methyl-4-quinolone there is obtained 3-dimethylamino-1-methyl-6-nitro-4-quinolone which after crystallisation from methanol forms red needles M.P. 225–227° C.

The 3-dimethylamino-1-methyl-4-quinolone used as starting material is itself prepared as follows: A mixture of 3.5 parts of 3-amino-1-methyl-4-quinolone, 20 parts of acetic acid, 13 parts of aqueous 36% w/v formaldehyde solution and a small amount of Adams' catalyst is shaken with hydrogen until the theoretical amount of hydrogen is absorbed. The mixture is then filtered and ice is added to the filtrate, which is then basified with sodium hydroxide solution. The mixture is extracted with chloroform, and the extract is washed with water, dried over anhydrous potassium carbonate and evaporated to dryness. The residue is crystallised from cyclohexane to give 3-dimethylamino-1-methyl-4-quinolone, M.P. 126° C.

*Example 4*

2.5 parts of 3-acetamido-1-ethyl-4-quinolone are added below 10° C. to 33 parts of concentrated sulphuric acid. A mixture of 2.7 parts of concentrated sulphuric acid and 1.92 parts of concentrated nitric acid is then added below 10° C. to this solution, and the mixture is stirred at room temperature for 1 hour. The mixture is then added to 300 parts of ice and the solid is collected, washed acid-free with water and crystallised from dimethyl formamide giving 3-acetamido-1-ethyl-6-nitro-4-quinolone as golden-yellow needles, M.P. 318–320° C.

The 3-acetamido-1-ethyl-4-quinolone used as starting material is itself prepared as follows: A mixture of 5 parts of 3-amino-1-ethyl-4-quinolone and 16.5 parts of acetic anhydride is boiled under reflux for 20 minutes and then poured on to ice. The mixture is basified with sodium hydroxide solution giving an oil which solidifies on standing. The solid product is collected and crystallised from water giving 3-acetamido-1-ethyl-4-quinolone, M.P., 161–162° C.

The 3-amino-1-ethyl-4-quinolone is itself prepared as follows: To a suspension of 10 parts of 1-ethyl-3-nitro-4-quinolone in 105 parts of acetic acid there is added a hot solution prepared by dissolving 50 parts of stannous chloride in 59 parts of concentrated hydrochloric acid. After the immediate and vigorous reaction a complete solution is obtained, and this is then heated for 2 hours on a steam bath. On cooling a white crystalline precipitate is formed, which is collected and then resuspended in dilute sodium hydroxide solution. The mixture is extracted with chloroform and the extract is washed with water, dried over anhydrous magnesium sulphate and evaporated to dryness giving 3-amino-1-ethyl-4-quinolone M.P. 148–150° C.

Example 5

In like manner to that described in Example 1 but using 3-acetamido-1:2-dimethyl-4-quinolone in place of the 3-acetamido-1-methyl-4-quinolone there is obtained 3-acetamido-1:2-dimethyl-6-nitro-4-quinolone which after crystallisation from water forms yellow needles M.P. 260° C.

Example 6

A mixture of 5 parts of 3-acetamido-1-methyl-6-nitro-4-quinolone and 50 parts of aqueous 20% hydrochloric acid is boiled under reflux for 2 hours. The mixture is then cooled and filtered and the solid residue is washed with 20% hydrochloric acid and then with acetone and dried. There is thus obtained 3-amino-1-methyl-6-nitro-4-quinolone hydrochloride as yellow needles M.P. 274° C.

The above hydrochloride salt is dissolved in water and the solution is made alkaline with sodium hydroxide solution. The precipitated solid is collected and crystallised from butanol giving 3-amino-1-methyl-6-nitro-4-quinolone as red needles, M.P. 266–267° C.

Example 7

1.3 parts of 3-(N-methyl acetamido)-1-methyl-6-nitro-4-quinolone (see Example 2 above) are boiled under reflux with 20 parts of aqueous 10% hydrochloric acid until complete solution is obtained. The mixture is then cooled and made alkaline with aqueous sodium hydroxide solution. The mixture is filtered and the solid residue is washed with water and dried. It is then crystallised from ethanol and there is thus obtained 3-methylamino-1-methyl-6-nitro-4-quinolone as brown needles, M.P. 289–291° C.

Example 8

A mixture of 6 parts of 3-acetamido-1-ethyl-6-nitro-4-quinolone (see Example 4 above), 8 parts of water and 4.75 parts of concentrated hydrochloric acid is boiled under reflux for 90 minutes. The mixture is then cooled and basified with caustic soda solution. The precipitated solid is collected and crystallised from dimethyl formamide giving 3-amino-1-ethyl-6-nitro-4-quinolone, M.P. 294° C. with decomposition.

Example 9

In like manner to that described in Example 7 but using 3-acetamido-1:2-dimethyl-6-nitro-4-quinolone (see Example 5) there is obtained 3-amino-1:2-dimethyl-6-nitro-4-quinolone which crystallises from dimethyl formamide as red needles, M.P. 285° C.

Example 10

A mixture of 0.5 part of 3-amino-1-methyl-6-nitro-4-quinolone and 5 parts of 98% formic acid is boiled under reflux for 10 minutes. The mixture is cooled and filtered and the residue is crystallised from β-ethoxyethanol giving 3-formamido-1-methyl-6-nitro-4-quinolone as yellow needles, M.P. 311° C. with decomposition.

Example 11

To a solution of 1.4 parts of 3-amino-1-methyl-6-nitro-4-quinolone in 85 parts of dry pyridine there are added 1.85 parts of benzoyl chloride. The mixture is allowed to stand for some time and the solid formed is then collected and crystallised from chlorobenzene when there is obtained 3-benzamido-1-methyl-6-nitro-4-quinolone, M.P. 260–262° C.

Example 12

To a mixture of 2 parts of 3-amino-1-methyl-6-nitro-4-quinolone and 100 parts of dry pyridine there are added 4.7 parts of p-acetamidobenzenesulphonyl chloride and the mixture is allowed to stand for 1½ hours. The mixture is then poured into 800 parts of water and the precipitated solid is collected and washed with water and methanol. It is then dissolved in hot dilute sodium hydroxide solution and reprecipitated with acid. The precipitate thus obtained is collected, dried and crystallised from dimethyl formamide giving 3-p-acetamidobenzenesulphonamido-1-methyl-6-nitro - 4 - quinolone, M.P. 336° C. with decomposition.

3 - p - aminobenzenesulphonamido - 1 - methyl - 6 - nitro-4-quinolone is prepared herefrom as follows: A mixture of 1 part of 3-p-acetamidobenzenesulphonamido-1-methyl-6-nitro-4-quinolone, 9 parts of water and 1 part of caustic liquor is boiled under reflux for 3 hours giving a red-brown solution which is filtered hot to remove insoluble material. Acidification of the filtrate with acetic acid gives a precipitate which is collected and crystallised from dilute acetic acid. There is thus obtained 3-p-aminobenzenesulphonamido-1-methyl-6-nitro-4-quinolone, M.P. 265–267° C.

Example 13

A mixture of 2.6 parts of 3-amino-1-methyl-6-nitro-4-quinolone hydrochloride, 1.5 parts of benzoyl cynamide and 25 parts of ethanol is boiled under reflux for 20 minutes. The mixture is filtered hot and the residue is stirred with 100 parts of cold dilute hydrochloric acid. It is then resuspended in water (100 parts) and the mixture is made alkaline with aqueous sodium hydroxide solution. The precipitated solid is collected, washed alkali-free with water, then washed with methanol and crystallised from dimethyl formamide. There is thus obtained 3 - ($N_3$ - benzoylguanidino - $N_1$) - 1 - methyl - 6 - nitro-4-quinolone as small yellow needles, M.P. 280° C. with decomposition.

What we claim is:

1. A new quinolone derivative selected from the group consisting of compounds having the formula

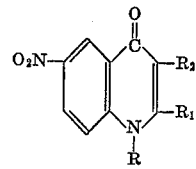

in which R is a member of the group consisting of lower alkyl, hydroxy lower alkyl and lower alkenyl groups; $R_1$ is a member of the group consisting of hydrogen and methyl radicals; $R_2$ is a member of the group consisting of amino, methylamino, dimethylamino, formamido, acetamido, benzamido, N-lower alkyl acetamido, p-aminobenzene sulphonylamino, lower alkoxycarbonylamino, ureido, and guanidino groups, and the non-toxic pharmaceutically acceptable salts thereof.

2. 3-amino-1-methyl-6-nitro-4-quinolone.
3. 3-formamido-1-methyl-6-nitro-4-quinolone.
4. 3-dimethylamino-1-methyl-6-nitro-4-quinolone.
5. 3-amino-1,2-dimethyl-6-nitro-4-quinolone.
6. 3-acetamido-1,2-dimethyl-6-nitro-4-quinolone.
7. A method of nitrating a compound having the formula

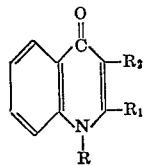

to form a 6-nitro quinolone having the formula

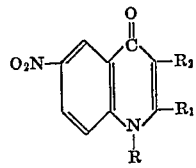

in which R is a member of the group consisting of a lower alkyl, hydroxy lower alkyl and lower alkenyl groups; $R_1$ is a member of the group consisting of hydrogen and methyl radicals; and $R_2$ is a member of the group consisting of dimethyl amino, formamido, acetamido, benzamido, and N-lower alkyl acetamido groups which comprises combining said compound with a mixture of concentrated nitric acid and concentrated sulfuric acid at a temperature of 0–10° C.

References Cited in the file of this patent

Beil: Hand der. Org. Chem., vol. XXII, 2nd Erganz, 4th ed. (1953), p. 417.

Drummond et al.: Australian J. of Sci. Res. A 2 (1949), pp. 630–637.